United States Patent [19]
Küpfer et al.

[11] 3,725,920
[45] Apr. 3, 1973

[54] DISTANCE MEASURING METHOD AND APPARATUS FOR THE PERFORMANCE THEREOF UTILIZING TWO TR

[75] Inventors: Hanspeter Kupfer, Geroldswil; Marcel Hossmann, Zurich, both of Switzerland

[73] Assignee: Albiswerk Zurich AG, Zurich, Switzerland

[22] Filed: Nov. 12, 1970

[21] Appl. No.: 88,644

[30] Foreign Application Priority Data

Nov. 24, 1969 Switzerland..........................17435/69

[52] U.S. Cl. ...............................343/6.5 R, 343/12 R
[51] Int. Cl. ..............................G01s 9/38, G01s 9/56
[58] Field of Search.......343/5 DP, 6.5 R, 6.5 LC, 12

[56] References Cited

UNITED STATES PATENTS

| | | | |
|---|---|---|---|
| 3,438,032 | 4/1969 | Cook | 343/6.5 R X |
| 3,187,327 | 6/1965 | Schneider et al. | 343/6.5 R |
| 3,377,590 | 4/1968 | Wendell | 343/6.5 R X |

*Primary Examiner*—Malcolm F. Hubler
*Attorney*—Werner W. Kleeman

[57] ABSTRACT

An apparatus and method for distance measurement by means of two transmitter-receiver devices arranged at the terminal points of the path to be measured and which can be selectively switched as a main- or auxiliary station. The invention contemplates automatically initiating transmission back of a difference signal produced at the auxiliary station upon the appearance of a phase quiescent condition at a measuring frequency control of the auxiliary station, arrival of such transmitted back difference signal at the main station automatically triggering measurement of a corresponding partial measurement result. Upon completion of each partial measurement result the measuring signal of the main station is automatically switched-off, and non-presence of at least one difference signal at the main- and auxilliary stations bringing about continuation of the measurement program to the next successive measuring frequency and switching-in the measuring signals.

3 Claims, 3 Drawing Figures

3,725,920

DISTANCE MEASURING METHOD AND APPARATUS FOR THE PERFORMANCE THEREOF UTILIZING TWO TR

BACKGROUND OF THE INVENTION

The present invention relates to a new and improved method for carrying out distance measurement operations by means of two transmitter-receiver devices which can be selectively switched to function as a main or auxiliary station, such transmitter-receiver devices being located at the terminal points of the path to be measured, and wherein to prevent ambiguous results or a multiplicity of results there are carried out in accordance with a measurement program successive measurements by means of measuring signals of different frequency. Furthermore, the measuring frequency of the auxiliary station is always controlled to possess a value differing by a certain amount from that of the main station, and at the main- and auxiliary stations there are generated differential signals due to mixing of the transmitted measuring signal and the received measuring signal, the differential signal produced in the auxiliary station being transmitted back to the main station where from the different measuring frequencies there can be determined partial measurement results by measuring the phases of the generated and transmitted back differential signals, and from which there can be derived the total measurement result.

In a prior art distance measuring technique of this type the different measuring frequencies are adjusted both at the main station as well as also at the auxiliary station by the operating personnel in order to carry out the measurement program. So as to be able to clearly communicate information concerning the measuring frequencies which are to be adjusted, both distance measuring devices located at the terminal points of the path to be measured are equipped with a two-way communication connection. This communication or speech channel uses the same carrier connection as the measuring system. With known measuring techniques the partial measurement results derived during each measurement are read-out by the operator, and from which there can be then derived the total measurement result.

The drawback of this prior art measuring technique and the equipment utilized for the performance thereof, resides in the fact that performance of the measuring program for distance measurement is complicated, and accordingly, both at the main station as well as at the auxiliary station qualified operating personnel must be present.

According to a further known technique for performing distance measurement operations, the individual partial measurement results are directly transmitted into an indicating mechanism at the main station. Depending upon whether the partial measurement result is derived from a coarse measurement with lower measuring frequencies or from a fine measurement with higher frequencies such result is counted in to the corresponding value places of the indicating mechanism. The measuring frequencies are selected such that the partial measurement results mutually overlap. An apparatus is provided at the indicating mechanism which automatically compares the momentarily overlapping digit places of the partial measurement results and can automatically correct by one unit the digit places of the coarser partial measurement result to be indicated. In this manner, the total result of the distance measurement operation is automatically calculated and indicated. Switching of the measuring frequencies at the auxiliary station is controlled from the main station by a pilot signal modulated upon the microwave carrier.

Now, this prior art technique has the drawback that at the main station there must be available a pilot signal transmitter and at the auxiliary station a pilot signal receiver. By the same token, in the case of a distance measuring system where both devices can be switched so as to function both as the main station as well as also the auxiliary station, it obviously follows that at each device there must be provided a pilot signal transmitter and a pilot signal receiver. It should thus be apparent that this type of system requires great expenditure in equipment.

SUMMARY OF THE INVENTION

Accordingly, a need still exists in the distance measuring art for measurement techniques and apparatus constructions not associated with the aforementioned drawbacks of the prior art equipment and techniques. Therefore, a primary object of the present invention is to provide an improved distance measuring method, and apparatus for the performance of the aforesaid inventive method, which is not associated with the aforementioned drawbacks of the prior art and fulfills most capably the existing need.

Another more specific object of the present invention relates to an improved method for carrying out distance measurement operations by means of two transmitter-receiver devices located at the terminal points of the path to be measured and which can be selectively switched over to function as a main- or auxiliary station, and in order to prevent ambiguous or a multiplicity of results measurements are performed in succession, on the basis of a measuring program, by means of measuring signals of different frequency, wherein the measuring frequency of the auxiliary station is always controlled so as to possess a value differing by a certain amount from that of the main station, and further wherein, differential signals are generated at the main- and auxiliary station by mixing the transmitted and the received measuring signals, the differential signal generated at the auxiliary station being transmitted back to the main station, partial measurement results being determined at the main station from the different measuring frequencies by performing phase measurements upon the generated and the transmitted back differential signals, with the total measurement result being derived from the aforementioned partial measurement results.

The inventive method is generally manifested by the features that, transmission back of the difference or differential signal generated at the auxiliary station is automatically switched-in or initiated upon the occurrence of phase quiescence or rest at the measuring frequency control, arrival of the transmitted back difference signal at the main station automatically triggering measurement of the relevant partial measurement results. Furthermore, upon termination of each partial result measurement operation the measuring signal at the main station is automatically switched-off, and in each main- and auxiliary station the omission of at least one difference signal causes actuation or advancement of the measuring program to the next successive measuring frequency and switching in of the measuring signals.

The inventive apparatus for carrying out the aforesaid inventive method is manifested by the features that, separate marker devices are provided at the main station for the generated difference signal and for the difference signal transmitted back by the auxiliary station as well as at the auxiliary station for the generated difference signal and for the difference signal internally transmitted or sent back via the transmitter-receiver device. Such marker devices mark or label the presence of difference signals by the appearance of logical signals at their outputs. Furthermore, a phase quiescence or phase rest-indicator is provided at the auxiliary station which is coupled to the measuring frequency control device and which indicates the rest or quiescent control condition through the appearance at its output of a logical signal. Furthermore, a logical AND-gate is provided at the auxiliary station, the first input of which is electrically coupled with the output of said marker device for the generated difference signal, the second input of which is electrically coupled with the output of the phase quiescence-indicator, and the output of which is connected with means for switching through the difference signal which is to be transmitted back. Furthermore, the phase measuring device is coupled via a trigger or tripping input with the output of a marker device for the transmitted-back difference signal and is further coupled via an output, which marks the termination of a measurement operation by delivering a logical signal, with means for switching-off the measuring signal. Additionally, in each station there is provided a program transmitter coupled through the agency of a logical switching circuit with the outputs of the marker devices, this program transmitter being connected with a measuring frequency oscillator for the purpose of switching the measuring frequencies. At the main station such program transmitter is additionally connected with the phase measuring device for purposes of switching the range and for control purposes and at the auxiliary station such is connected with the frequency control device for switching the direction of control of the latter.

The new and improved method of the present invention has the advantage that no pilot signals are necessary for the purpose of controlling the auxiliary station. According to the invention, the remote control of the auxiliary station for carrying out a measurement program is undertaken by the measuring signals themselves. Hence there is a saving in equipment for transmitting and receiving pilot signals. The novel method in conjunction with the heretofore mentioned automatic indicating mechanism provides a very simple solution for a completely automatic distance measuring installation.

Since the switch-over or advance of a measuring program to the next successive measuring frequency can be triggered both at the main- as well as also at the auxiliary station due to the non-appearance of the generated or transmitted back difference signal at the relevant station, this portion of the circuitry is completely independent of the mode of operation of the main- or auxiliary station and need not be switched.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
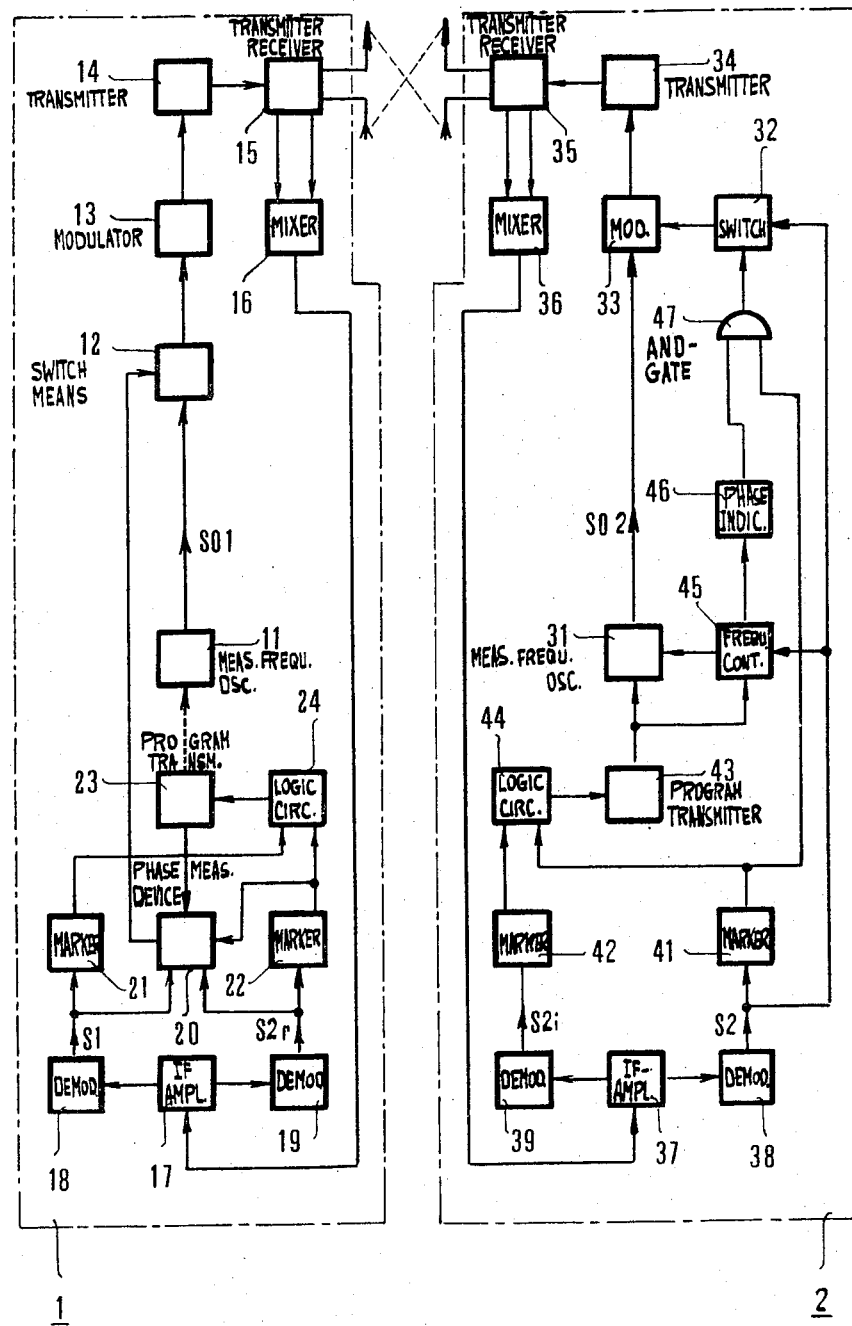
FIG. 1 is a block circuit diagram of a distance measuring installation designed according to the teachings of the present invention, and embodying two selectively switchable distance measuring devices serving as the main- or auxiliary stations.

Describing now the drawings, in FIG. 1 there is shown a block circuit diagram of a preferred embodiment of distance measuring apparatus or installation consisting of the identically constructed distance measuring devices which can be selectively switched to provide the main- or auxiliary stations 1 and 2. In the exemplary embodiment under consideration there have, in each instance, only been illustrated the components of the relevant stations 1 or 2 which are in operation. On the other hand, the components of both stations 1, 2 which are switched-off during the corresponding operation have been conveniently omitted from the drawing.

Turning now more specifically to FIG. 1 the therein illustrated main station 1 comprises a measuring frequency oscillator 11. Oscillator 11 produces a measuring signal SO1 possessing the frequency $f01$. This measuring signal SO1 is delivered via switch means 12 for switching-in and switching-out such signal, to a modulator 13 of transmitter 14. The output of the carrier signal transmitter 14 is electrically coupled with a transmitter-receiver unit 15 transmitting to the auxiliary station 2 the carrier signal modulated by the measurement signal SO1. At the transmitter-receiver unit or device 15 there is received the carrier signal transmitted by the auxiliary station, which carrier signal has been modulated by a measuring signal SO2 as well as by a difference signal S2. The significance of the signals SO2 and S2 will be considered more fully hereinafter.

The carrier signal of the auxiliary station 2 and a portion of its own carrier signal is delivered to a mixer circuit 16. By mixing both modulated carrier signals in the mixer circuit 16 there is produced in known manner an intermediate frequency signal (IF-signal). The IF-signal is amplified in an intermediate frequency amplifier 17 (IF-amplifier) and delivered to two demodulators or detectors 18 and 19. Detector 18 selects from the intermediate frequency mixed signal a difference signal S1 resulting from the mixing of the transmitted measuring signal SO1 and the received measuring signal SO2, and which signal S1 possesses a frequency corresponding to the difference of both measuring frequencies $f01$ and $f02$. A difference signal $S2r$ is removed from the intermediate frequency mixed signal at the detector 19, this difference signal being generated at the auxiliary station in analogous manner to the signal S1 at the main station and transmitted back to the main station. Techniques suitable for this purpose are well known in the art, as for instance disclosed in U.S. Pat. No. 3,078,460, to Werner et al.

Separate marker devices 21 and 22 are provided for the generated difference signal S1 and for the transmitted back difference signal S2r. Marker devices 21 and 22 mark or label the presence of difference signals S1 and S2r through the appearance of logical signals at their outputs. Furthermore, a digital phase measuring device 20 is provided for the purpose of determining and deriving a partial measurement result from the measurements. Both of the difference signals S1 and S2r are delivered to the phase measuring device 20. Additionally, the phase measuring device 20 is coupled via a trigger input with the output of the marker device 22 for the transmitted back difference signal S2r and is coupled via an output, which marks the termination of a measurement operation by delivering a logical signal, with switch means 12 for switching-out the measurement signal S01. With the outputs of the marker or marking devices 21 and 22 there is electrically coupled a program transmitter 23 through the agency of a logical switching or coupling circuit 24. Program transmitter 23 is electrically coupled with the measuring frequency oscillator 11 for switching the measuring frequencies and for switching the range and for control is coupled with the phase measuring device 20.

The logical switching circuit 24 can, for instance, consist of an AND- or OR-gate for both of the delivered voltages. In the event only one of both signals S1 and S2r should be effective, then, the logic circuit 24 can be replaced by a direct connection from the relevant marker device 21 or 22 to the program transmitter 23.

At the auxiliary station 2 there is provided a measuring frequency oscillator 31, generating a measuring signal S02 with a measuring frequency $f02$. The measuring frequency oscillator 31 is directly coupled with a modulator 33 of a carrier signal transmitter 34. The output of transmitter 34 is coupled with the transmitter-receiver unit or device 35 which transmits to the main station 1 the carrier signal modulated by the measuring signal S02. At the transmitter-receiver device 35 there is received the carrier signal modulated by the measuring signal S01 which has been transmitted from the main station 1. Due to mixing both modulated carrier signals at the mixer circuit 36 there is produced in known manner an intermediate frequency signal. This intermediate frequency signal is amplified at the intermediate frequency amplifier 37, then delivered to two demodulators or detectors 38 and 39. A difference signal S2 is selected by the detector 38 from the intermediate frequency mixed signal, this difference signal resulting from mixing of the transmitted measuring signal S02 and the received measuring signal S01 and possessing a frequency corresponding to the difference of both measurement frequencies $f01$ and $f02$. The detector 39 removes from the intermediate frequency mixed signal a difference signal S2i which is transmitted back internally. This signal corresponds to the signal S2 which is to be transmitted back.

The signal S2i appeared in the following manner: the difference signal S2 is modulated upon the carrier signal of the transmitter 34. A portion of the carrier wave arrives via the transmitter-receiver device 35 at the mixer circuit 36, where this portion is mixed with the received carrier wave from the main station 1. At the intermediate frequency mixed signal there appears a component modulated by the signal S2, and from which there can be obtained by the detector 39 the difference signal S2i which is internally sent back.

A respective marker of marking device 41 and 42 is provided for the difference signals S2 and S2i, respectively, marker devices 41 and 42 marking or labelling the presence of a difference signal S2 and S2i, respectively, through the appearance of a logical signal at their respective output. The generated difference signal S2 is additionally delivered to a frequency control device 45 acting upon the measuring frequency oscillator 31. A phase quiescent or rest-indicator 46 is provided which is coupled with the measuring frequency control device 45 and which indicates the rest or quiescent control state through the appearance of a logical signal at its output.

Furthermore, a logic AND-gate 47 is provided, a first input of which is coupled with the output of the marker device 41, the second input of which is coupled with the output of the phase rest-indicator 46, and the output of which is coupled with switch means 32 for transmitting or switching-through the transmitted back difference signal S2. With the outputs of the marker devices 41 and 42 there is coupled, through the agency of a logical coupling circuit 44, a program transmitter 43, which for the purpose of switching the measuring frequencies is coupled with the measuring frequency oscillator 31 and for switching the sense or direction of control of the frequency control device 45 is coupled with the latter, as best shown by referring to FIG. 1.

Insofar as the logic switching or coupling circuit 44 is concerned, such can be designed similar or different to that provided at the main station 1, depending upon from which signal the criteria for switching through a measuring program is derived.

Figure 2:
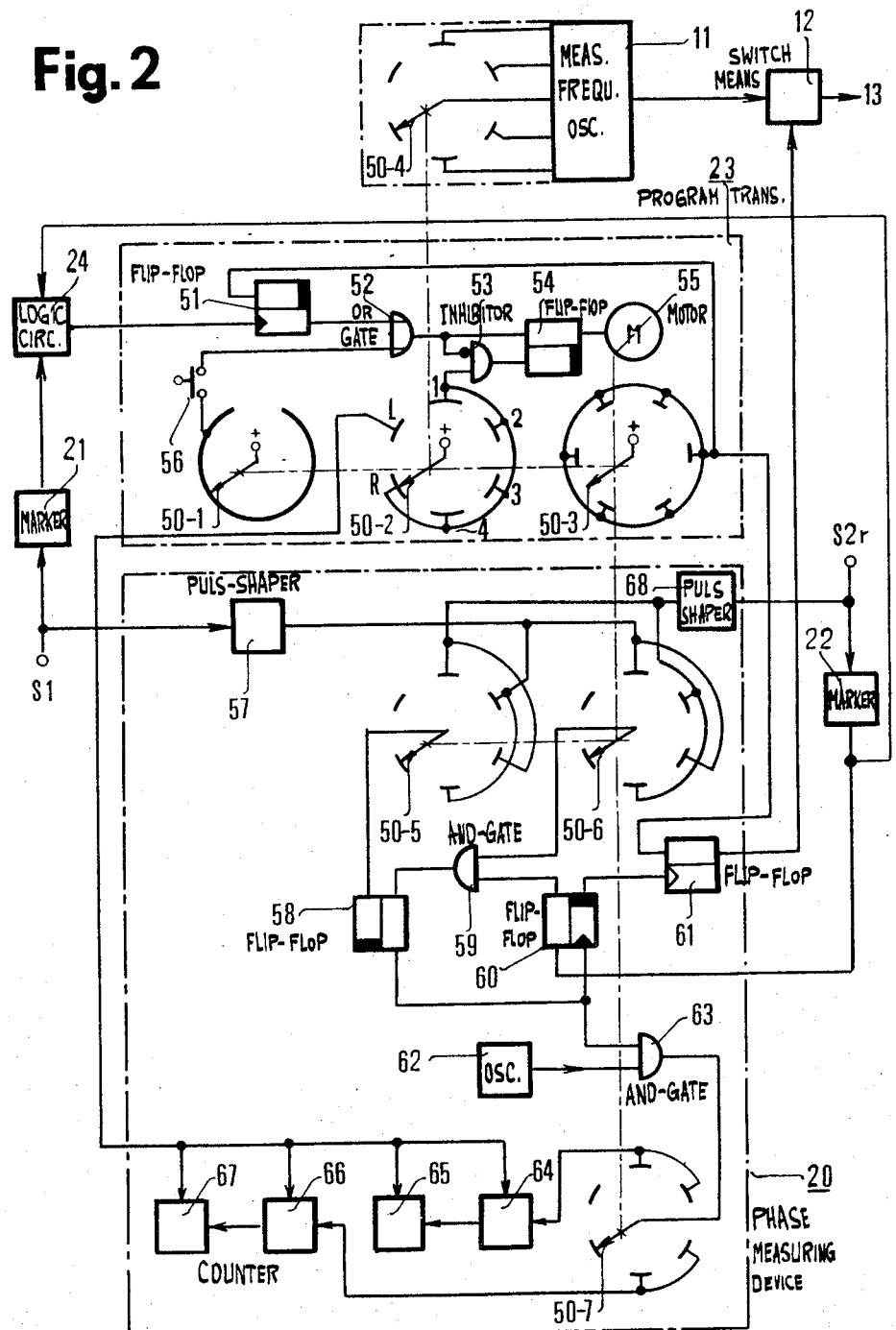
FIG. 2 illustrates an embodiment of a program transmitter located at the main station as well as the components of a phase measuring device and oscillator controlled by the program transmitter.

The construction of the program transmitter 23 of the main station 1 is illustrated in FIG. 2. At this program transmitter 23 there is provided a six-position selector switch 50 controlled by a motor 55, selector switch 50 having segments 50-1 to 50-3 arranged at the actual program transmitter 23. Further segments 50-4 and 50-5 to 50-7 are respectively provided at the measuring frequency oscillator 11 and the phase measuring device 20 controlled by the program transmitter, as shown in FIG. 2.

The segment 50-1 possesses a continuous contact track which is only interrupted at the switch position 1, that is to say, at the position of the first measuring frequency. This contact track is coupled with one side of a manual switch or contact 56. The sliding contact or wiper arm of the segments 50-1, 50-2 and 50-3 are coupled with the positive pole of a voltage source.

At the segment 50-2 the contacts 1 to 4 and R are electrically coupled with one another and lead to the direct input of an inhibitor 53. The contact L is coupled with the phase measuring device 20.

The contacts of the segment 50-3 are offset through half an angular division with respect to the contacts of the other segment. They are all coupled with one another and lead to the input of a bistable flip-flop circuit 51. This flip-flop circuit 51 possesses a defined basic or fundamental position which is then assumed upon switching-in of the device. The side illustrated in the drawing for the basic position provides at the output a signal corresponding to logic 1. The other side of the bistable flip-flop circuit 51 possesses a dynamic input which is coupled with the logic circuit 24. At the output of the bistable flip-flop circuit 51 there is coupled the one input of an OR-gate 52. The second input of OR-gate 52 is connected with the manual switch or contact 56. The output of the OR-gate 52 is connected with the negated input of the inhibitor 53 and leads to the one input of a bistable flip-flop circuit 54. This flip-flop circuit 54 possesses a defined basic position illustrated in the drawing. At the output of the working side there is connected the motor 55. The segment 50-4 at the measuring frequency oscillator 11 serves for switching the measuring frequencies.

The segments 50-5 and 50-6 are connected as two-pole switch means for the input signals S1 and S2r of the phase measuring device 20. These signals are delivered via pulse shapers 57 and 68. Switching of these signals brings about that during the digital phase measurement in the one position of the switch means 50-5, 50-6 the signal S1 triggers the digital counting operation and the signal S2r stops the digital counting operation. In the other position the counting is triggered by the signal S2r and stopped by the signal S1.

A four-place result storage means having two counting decades 64, 65 for the partial measurement result of a fine measurement and two counting decades 66, 67 for the partial measurement result of a course measurement is provided at the phase measuring device 20.

By means of the segment 50-7 the counting pulses delivered from the pulse generator 62 via the AND-gate 63 are selectively delivered to the fine measurement result storage means 64, 65 or to the course measurement result storage means 66, 67. The counting decades 64 to 67 each possess a resetting or restoring connection or line coupled with the contact L of the segment 50-2.

At the sliding contact of the segment 50-6, there is removed the signal which in each case triggers the digital counting operation, and at the sliding contact of the segment 50-5 there is tapped-off the signal which in each case stops the digital counting operation. Both of these signals are delivered to the inputs of a flip-flop circuit 58, hereby the triggering signal is delivered via and AND-gate 59 and the stopping signal is directly delivered. The output of the bistable flip-flop circuit 58 is connected to the second input of the AND-gate 63 and simultaneously to a dynamic input of a further bistable flip-flop circuit 60. The second input of the bistable flip-flop circuit 60 is coupled with the output of the marker device 22 for the transmitted back signal S2r. The one output of the bistable flip-flop circuit 60 is coupled with an input of the AND-gate 59 and the other output is coupled with the dynamic input of a bistable flip-flop circuit 61. The second input of this flip-flop circuit 61 is connected with the contacts of the segment 50-3. The output of this flip-flop circuit 61 leads to the switch means 12. The flip-flop circuits 58 and 60 possess a basic position indicated in the drawing.

Figure 3:
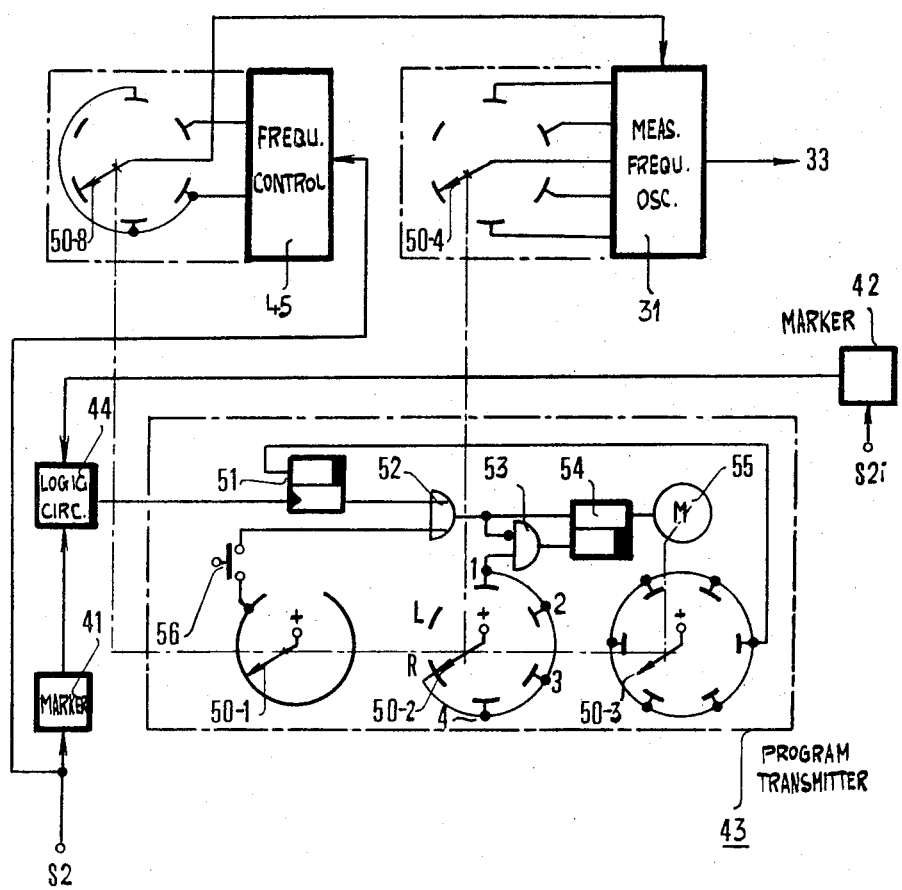
FIG. 3 illustrates an embodiment of a program transmitter at the auxiliary station as well as the components of an oscillator and the frequency control apparatus controlled by the program transmitter.

In FIG. 3 there is illustrated the construction of the program transmitter 43 of the auxiliary station 2. This program transmitter 43 is of identical construction to that of the main station 1. It is connected with the logic coupling circuit 44. Apart from the segments 50-1, 50-2, 50-3 for the control of the actual program transmitter and the segment 50-4 for switching the measuring frequency oscillator 31 there is provided a further segment 50-8 for reversal of the control sense or direction of the frequency control device 45.

Having had the benefit of the description of the foregoing exemplary embodiment of equipment there will now be described the performance of a distance measuring operation, which is as follows:

In order to initiate a measuring operation it is necessary to close for a brief period of time the manual switches or contacts 56, both at the main station 1 as well as at the auxiliary station 2. The voltage delivered to the segment 50-1 is therefore switched through via the OR-gate 52 to the input of the bistable flip-flop circuit 54. Flip-flop circuit 54 then trips into its work position or state and at its output side feeds the motor 55. This motor 55 initially moves the contact arms of the segments of the program transmitter until reaching switch position 1. In the main station 1, upon sweeping or moving past the position L via the segment 50-2 a voltage is applied to the resetting connection of the counting stages or decades 64 to 67, so that these are set to zero or null. The motor 55 is switched-off in position 1 in that the segment 50-2 delivers a voltage via the inhibitor 53 to the bistable flip-flop circuit 54 and this trips back into its other state. In the position 1 of the program transmitter 23 there is produced by means of the measuring frequency oscillator 11 a signal S01 with the frequency f01 which is suitable for carrying out a fine measurement operation. During sweeping past or travel of the program transmitter to position 1 there is likewise applied by means of the segment 50-3 a voltage to the input of the bistable flip-flop circuit 61, so that this flip-flop circuit is shifted into its work position and a voltage is applied to the switch means 12. This then switches the measuring signal S01 through to the modulator 13. The measuring frequency oscillator 31 in the auxiliary station generates a signal S02, the frequency f02 of which is chosen to be lower by a certain amount.

The respective carrier signals produced by the transmitters 14 and 34, modulated by the relevant measuring signals S01 and S02, are transmitted to the other or opposite station. At the transmitter-receiver devices 15 and 35 there are coupled-out the respective received wave as well as a portion of the transmitted wave and delivered to the corresponding mixer circuit 16, 36. The generated intermediate frequency signals arrive at the intermediate frequency amplifier means 17 and 27 and thereafter at the detectors 18, 19 and 38, 39 respectively. The difference signal S2 with the frequency $f01-f02$ generated in the auxiliary station 2 at the detector 38 is delivered to the frequency control device 45. At the frequency control device 45 the frequency of the difference signal S2 is compared with a reference value and in accordance with such difference or deviation there is produced an error voltage for tuning the measuring frequency oscillator 31.

The phase rest-indicator or phase quiescent indicator 46 coupled with the frequency control device 45 delivers at its output a signal as soon as a rest or quiescent control condition has been reached. In other words, the phase quiescent or phase rest indicator 46 indicates the existence of a constant phase relationship between the difference signal S2 and an internal reference value - oscillator signal at the frequency control device 45. This output signal of the indicator 46 together with the output signal of the marker device 41 acts via the AND-gate 47 upon the switch means 32 for switching through the signal S2 to be transmitted back. The means 32 switches the signal S2 through to the modulator 33, so that such can be transmitted back to the main station 1. The transmitted back signal S2r is derived from the mixed frequency of the intermediate frequency signal and is delivered to the phase measuring device 20 as well as to the marker device 22. The marker device 22 delivers at its output a signal to the phase measuring device 20, so that phase measurement can be initiated by means of the adjusted or set measuring frequencies. The output signal of the marker device 22 switches the bistable flip-flop circuit 60 into its work state. The flip-flop circuit 60 delivers a voltage to the AND-gate 59. Pulses are generated at the pulse shaper 57 from the signal S1. As soon as a pulse has arrived via the segment 50-6 at the AND-gate 59, this transmits a pulse to the flip-flop circuit 58. Flip-flop circuit 58 then switches into its work state and delivers at its output a voltage to the AND-gate 63 and the flip-flop circuit 60. From this moment of time the counting pulses of the counting oscillator 62 are switched through by means of the AND-gate 63 via the segment 50-7 to the fine measurement result storage means 64, 65 (digital counting).

Similarly, from the signal S2r there are likewise formed pulses by means of the pulse shaper 68. As soon as one such pulse arrives via the segments 50-5 at the flip-flop circuit 58 such is flipped or switched back. The output signal of the flip-flop circuit 58 disappears, so that the flip-flop circuit 60 likewise is switched-back and the AND-gate 63 is blocked. Blocking of the AND-gate 63 signifies termination of the phase measurement with the relevant measuring frequencies. The partial measurement result of the first measurement is stored in the counting decades or stages 64 and 65. Due to the ascending flank of the output signals delivered by the flip-flop circuit 60 the flip-flop circuit 61 is tripped or switched back, so that the switch means 12 for switching through the signal S01 is interrupted.

Due to interruption of the output signal of the measuring oscillator the output signals at the marker devices 21, 22, 41 and 42 disappear. The descending flanks of these signals flip or switch the flip-flop circuit 51 via the logic circuits 24, 44 into the work position. Depending upon the construction and design of the logic switching or coupling circuits 24 and 44 there are used for this purpose the descending flanks of one or the other or both marker output signals. The output voltages of the flip-flop circuit 51 arrive via the OR-gate 52 at the flip-flop circuit 54 which trip into the work condition and switch-in the motor 55, so that the program transmitters 23, 43 are brought into position 2. Due to switching of the program transmitter to the position 2 the oscillators 11 and 31 are switched-over to the next successive measuring frequency. During such travel or sweep a voltage is delivered by the segment 50-3 which switches the flip-flop circuit 51 into the rest condition and the flip-flop circuit 61 into the work condition. The output signal of the flip-flop circuit 61 brings about that the switch means 12 again switches-through the measuring signal S01 at the main station 1.

The procedures performed during the first measurement are repeated in exactly the same manner during the measurement operations with the other measuring frequencies at the positions 2, 3 and 4.

In the present exemplary embodiment the functions of the signal S1 and S2r are interchanged for the phase measurement by means of the segments 50-5 and 50-6. In the positions 1 and 3 the counting-in of counting pulses into the measurement result storage means 64 to 67 is initiated or triggered by the signal S1 and stopped by the signal S2r, whereas in the positions 2 and 4 triggering of the counting operation is undertaken by the signal S2r and stopping of such counting operation by the signal S1. The interchange of the functions is predicted upon the employed measuring principle, by means of which the result is obtained by addition or subtraction.

Additionally, by means of the segment 50-7, in the positions 1 and 2, the counting pulses are introduced into the fine measurement result storage means 64 and 55, whereas in the positions 3 and 4 there occurs counting into the coarse measurement result storage means 66 and 67. From the coarse-and the fine measurement results there is composed and indicated in known manner the total measurement result.

Since, in accordance with the employed measuring principle the measuring frequency $f02$ of the auxiliary station 2 during the one measurement operation is chosen to be higher by a certain amount and during the other measuring operation lower by a certain amount than that of the main station 1, the sense or direction of control of the frequency control circuit must be accommodated to the momentary position of the frequency $f02$. This is taken into account by the segment 50-8 which switches-through the suitably poled control signal to the measuring frequency oscillator 31.

While there is shown and described present preferred embodiments of the invention, it is to be distinctly understood that the invention is not limited thereto but may be otherwise variously embodied and practiced within the scope of the following claims. Accordingly,

What is claimed is:

1. Method for distance measurement by means of two transmitter-receiver devices arranged at the terminal points of the path to be measured and which can be selectively switched as a main- or auxiliary station, and at which transmitter-receiver devices for the purpose of preventing ambiguous results there are carried out in succession, in accordance with a measurement program consisting of a series of different measurement frequencies, measurements by means of measuring signals of different frequencies, the measuring frequency of the auxiliary station being controlled to possess a value which is different by a certain amount from that of the main station, and wherein in the main and auxiliary station by mixing the transmitted and the received measuring signals there is produced a difference signal, with the difference signal produced at the auxiliary station being transmitted back to the main station where for the different measuring frequencies there is determined from the generated and the transmitted back difference signals by carrying out a phase measurement a partial measurement result, and from which partial measurement results there can be derived the total measurement result, the improvement comprising the steps of: automatically initiating transmission back of the difference signal produced in the auxiliary station upon the appearance of a phase quiescent condition at a measuring frequency control of the auxiliary station, arrival of such transmitted back difference signal at the main station automatically triggering measurement of a corresponding partial measurement result, and upon completion of each partial measurement result automatically switching-off the measuring signal of the main station, and non-presence of at least one difference signal at the main-and auxiliary stations bringing about continuation of the measurement program to the next successive measuring frequency and switching-in of the measuring signals.

2. An arrangement for carrying out distance measurement operations, comprising a main station and an auxiliary station, a transmitter-receiver means and a measuring frequency oscillator provided for each said station, each measuring frequency oscillator being switchable to different measuring frequencies, a measuring frequency control device provided for the measuring frequency oscillator of said auxiliary station, a phase measuring device possessing partial measurement result storage means provided for said main station for determining and forming partial measurement results, separate marker means provided at said main station for a generated difference signal and for a difference signal transmitted back by said auxiliary station and separate marker means at said auxiliary station for a generated difference signal and for a difference signal transmitted back internally via the transmitter-receiver device of said auxiliary station, said marker means having respective outputs marking the presence of difference signals trough the appearance of logic signals at their respective outputs, a phase quiescent-indicator means having output means provided at said auxiliary station, said phase quiescent indicator means being electrically coupled with said measuring frequency control device, said phase quiescent-indicator means indicating a quiescent control condition through the appearance of a logic signal at its output means, a logical AND-circuit provided at said auxiliary station, said AND-circuit having a first input coupled with an output of the marker means for the generated difference signal, a second input coupled with said output means of said phase quiescent-indicator means and an output connected with means for switching-through the transmitted back difference signal, said phase measuring device being electrically connected via a trigger input with an output of said marker means for the transmitted back difference signal and via an output, marking the termination of a measurement operation by delivering a logic signal, with switch means for switching-off the measuring signal, each station further being provided with program transmitter means, logic circuit means for coupling said program transmitter means with the outputs of the associated marker means, each said program transmitter means being coupled with its associated measuring frequency oscillator for switching the measuring frequencies, said program transmitter means at said main station additionally being coupled with said phase measuring device for range switching and control, and said program transmitter means at the auxiliary station being coupled with said frequency control device for switching the control sense thereof.

3. An arrangement for carrying out distance measurement operations, comprising a main station and an auxiliary station, a transmitter-receiver means and a measuring frequency oscillator provided for each said station, each measuring frequency oscillator being switchable to different measuring frequencies, a measuring frequency control device provided for the measuring frequency oscillator of said auxiliary station, a phase measuring device possessing partial measurement result storage means for determining and forming partial measurement results, separate marker means provided at said main station for a generated difference signal and for a difference signal transmitted back by said auxiliary station and separate marker means at said auxiliary station for a generated difference signal and for a difference signal transmitted back internally via the transmitter-receiver device of said auxiliary station, said marker means having respective outputs marking the presence of difference signals through the appearance of logic signals at their respective outputs, a phase quiescent-indicator means having output means provided at said auxiliary station, said phase quiescent-indicator means being electrically coupled with said measuring frequency control device, said phase quiescent-indicator means indicating a quiescent control condition through the appearance of a logic signal at its output means, a logical AND-circuit provided at said auxiliary station, said AND-circuit having a first input coupled with an output of said marker means for the generated difference signal, a second input coupled with said output means of said phase quiescent-indicator means and an output connected with means for switching-through the transmitted back difference signal, said phase measuring device being electrically connected via a trigger input with an output of said marker means for the transmitted back difference signal and via an output, marking the termination of a measurement operation by delivering a logic signal, with switch means for switching-off the measuring signal, each station further being provided with program transmitter means coupled with the outputs of the associated marker means, each said program transmitter means being coupled with its associated measuring frequency oscillator for switching the measuring frequencies, and said measuring frequency oscillator at the auxiliary station being coupled with said frequency control device.

* * * * *